US012639088B1

(12) United States Patent
Browder et al.

(10) Patent No.: US 12,639,088 B1
(45) Date of Patent: May 26, 2026

(54) APPARATUS AND METHOD FOR AUTOMATICALLY UPDATING A VISUAL ELEMENT ON A GRAPHICAL USER INTERFACE

(71) Applicant: Signet Health Corporation, North Richland Hills, TX (US)

(72) Inventors: Blake Browder, Dallas, TX (US); Joy Figarsky, Little Rock, AR (US)

(73) Assignee: Signet Health Corporation, North Richland Hills, TX (US)

( * ) Notice: Subject to any disclaimer, the term of this patent is extended or adjusted under 35 U.S.C. 154(b) by 0 days.

(21) Appl. No.: 18/957,741

(22) Filed: Nov. 23, 2024

(51) Int. Cl.
*G06F 9/451* (2018.01)
*G06F 3/0482* (2013.01)

(52) U.S. Cl.
CPC ............ *G06F 9/451* (2018.02); *G06F 3/0482* (2013.01)

(58) Field of Classification Search
CPC ............................... G06F 9/451; G06F 3/0482
See application file for complete search history.

(56) References Cited

U.S. PATENT DOCUMENTS 11,049,299 B2   6/2021   Arden
11,829,571 B2   11/2023   Piper

| | | | | |
|---|---|---|---|---|
| 12,164,943 | B1 * | 12/2024 | Mahmud | G06F 9/452 |
| 2007/0198126 | A1 * | 8/2007 | Black | G05D 1/0055 |
| | | | | 700/200 |
| 2020/0042147 | A1 * | 2/2020 | Ford | G06F 3/0483 |
| 2020/0073529 | A1 * | 3/2020 | Yang | G06F 3/017 |
| 2022/0075515 | A1 * | 3/2022 | Floren | G06F 3/04847 |
| 2023/0259714 | A1 * | 8/2023 | Lange | G06F 40/237 |
| | | | | 704/9 |

FOREIGN PATENT DOCUMENTS

| CN | 117795501 A | 3/2024 |
|---|---|---|
| WO | 2019234736 A1 | 12/2019 |

* cited by examiner

*Primary Examiner* — Stephen S Hong
*Assistant Examiner* — Darrin Hope
(74) *Attorney, Agent, or Firm* — Caldwell LLC

(57) ABSTRACT

An apparatus and method for automatically updating a visual element on a graphical user interface. The apparatus includes at least a processor and a memory communicatively connected to the at least a processor. The memory instructs the processor to generate a graphical user interface comprising a plurality of visual elements, wherein the plurality of visual elements comprises a plurality of interactive components, wherein each of the plurality of interactive components comprises an interaction event handler, display at least a command corresponding to an interactive component, detect, using an interaction event handler of a plurality of interaction event handlers, input corresponding to a reference datum of the at least a command, determine, using a tracking module, interaction data corresponding to the input, and generate a modified graphical user interface.

18 Claims, 8 Drawing Sheets

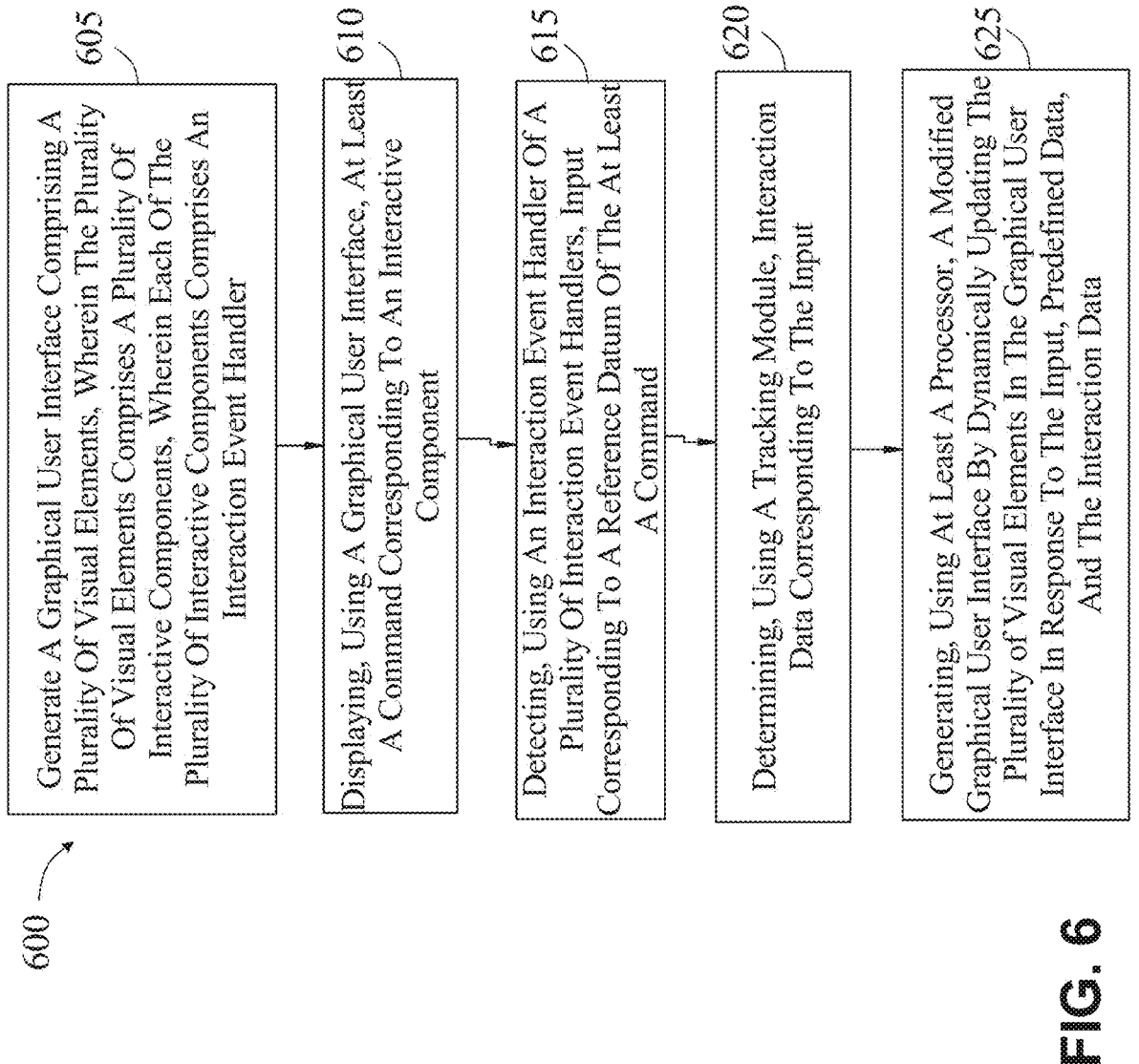

600

605
Generate A Graphical User Interface Comprising A Plurality Of Visual Elements, Wherein The Plurality Of Visual Elements Comprises A Plurality Of Interactive Components, Wherein Each Of The Plurality Of Interactive Components Comprises An Interaction Event Handler 610
Displaying, Using A Graphical User Interface, At Least A Command Corresponding To An Interactive Component 615
Detecting, Using An Interaction Event Handler Of A Plurality Of Interaction Event Handlers, Input Corresponding To A Reference Datum Of The At Least A Command 620
Determining, Using A Tracking Module, Interaction Data Corresponding To The Input 625
Generating, Using At Least A Processor, A Modified Graphical User Interface By Dynamically Updating The Plurality of Visual Elements In The Graphical User Interface In Response To The Input, Predefined Data, And The Interaction Data

FIG. 6

APPARATUS AND METHOD FOR AUTOMATICALLY UPDATING A VISUAL ELEMENT ON A GRAPHICAL USER INTERFACE

FIELD OF THE INVENTION

The present invention generally relates to the field of graphical user interfaces. In particular, the present invention is directed to an apparatus and a method for automatically updating a visual element on a graphical user interface.

BACKGROUND

Existing graphical user interfaces typically employ rigid, predefined templates and generalized protocols that are not optimized for safety demands across different facility zones. This static configuration necessitates manual navigation through extensive safety information, potentially resulting in overlooked or delayed critical safety actions. Additionally, traditional graphical user interfaces do not leverage real-time data processing or generate adaptive responses based on dynamic user inputs, thus limiting the system's ability to proactively adjust to evolving safety concerns.

SUMMARY OF THE DISCLOSURE

In an aspect, an apparatus for automatically updating a visual element on a graphical user interface includes at least a processor and a memory communicatively connected to the at least a processor. The memory contains instructions configuring the processor to generate a graphical user interface comprising a plurality of visual elements, wherein the plurality of visual elements comprises a plurality of interactive components, wherein each of the plurality of interactive components comprises an interaction event handler, display, using the graphical user interface, at least a command corresponding to an interactive component, detect, using an interaction event handler of a plurality of interaction event handlers, input corresponding to a reference datum of the at least a command, determine, using a tracking module, interaction data corresponding to the input, and generate a modified graphical user interface by dynamically updating the plurality of visual elements in the graphical user interface in response to the input, predefined data, and the interaction data.

In another aspect, a method for automatically updating a visual element on a graphical user interface includes generating, using at least a processor, a graphical user interface comprising a plurality of visual elements, wherein the plurality of visual elements comprises a plurality of interactive components, wherein each of the plurality of interactive components comprises an interaction event handler, displaying, using the graphical user interface, at least a command corresponding to an interactive component, detecting, using an interaction event handler of a plurality of interaction event handlers, input corresponding to a reference datum of the at least a command, determining, using a tracking module, interaction data corresponding to the input, and generating, using the at least a processor, a modified graphical user interface by dynamically updating the plurality of visual elements in the graphical user interface in response to the input, predefined data, and the interaction data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a block diagram of an exemplary method for automatically updating a visual element on a graphical user interface;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for automatically updating a visual element on a graphical user interface. The apparatus includes at least a computing device comprised of a processor and a memory communicatively connected to the processor. The memory instructs the processor to generate a graphical user interface comprising a plurality of visual elements, wherein the plurality of visual elements comprises a plurality of interactive components, wherein each of the plurality of interactive components comprises an interaction event handler. The processor displays, using the graphical user interface, at least a command corresponding to an interactive component. The processor detects, using an interaction event handler of a plurality of interaction event handlers, input corresponding to a reference datum of the at least a command. Additionally, the processor determines, using a tracking module, interaction data corresponding to the input. The processor generates a modified graphical user interface by dynamically updating the plurality of visual elements in the graphical user interface in response to the input, predefined data, and the interaction data.

Figure 1:
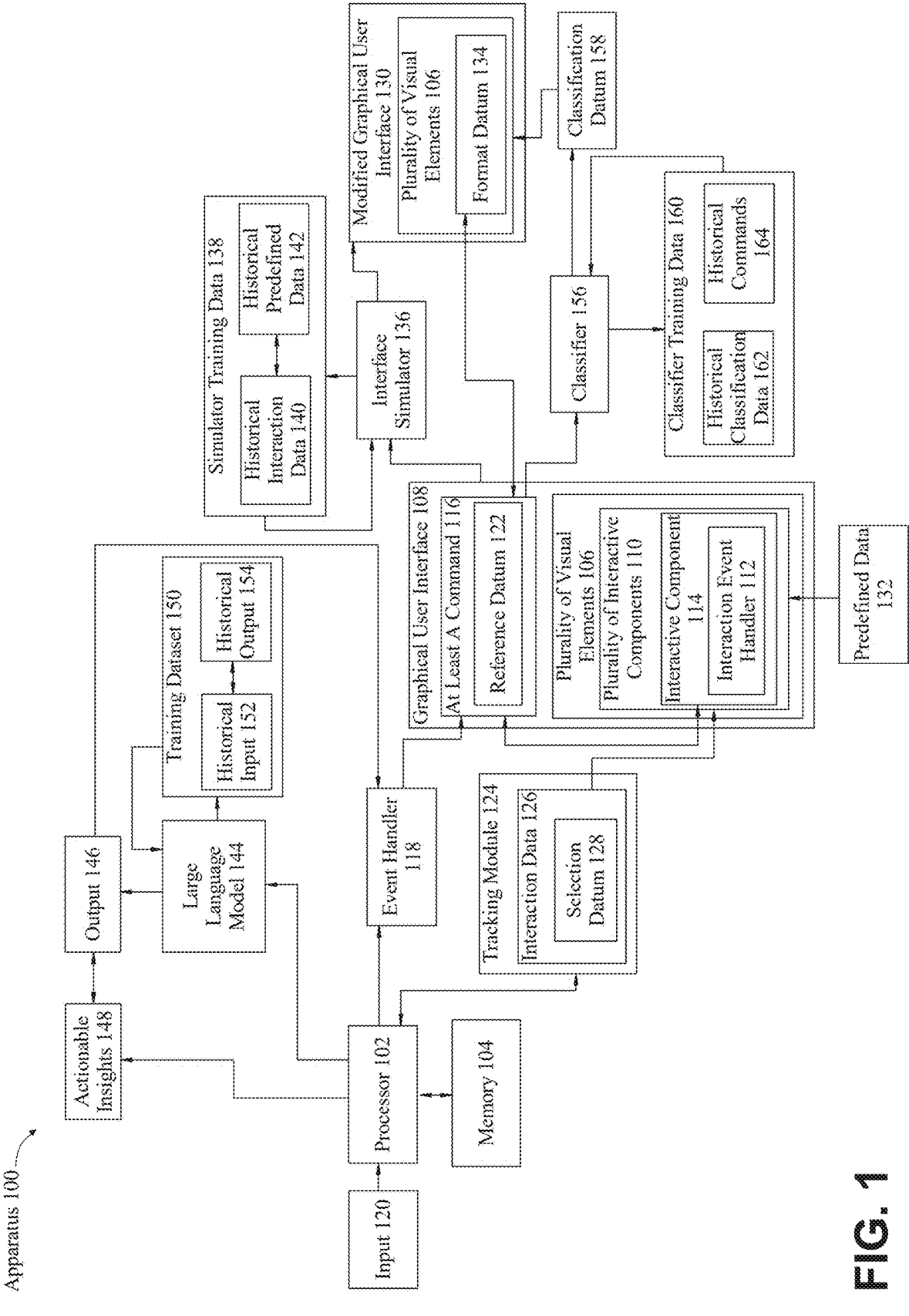
FIG. 1 is a block diagram of an apparatus for automatically updating a visual element on a graphical user interface.

Referring now to FIG. 1, an exemplary embodiment of apparatus 100 for automatically updating a visual element 106 on a graphical user interface 108 is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input 120 of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to generate a graphical user interface 108 comprising a plurality of visual elements 106, wherein the plurality of visual elements 106 comprises a plurality of interactive components 110, wherein each of the plurality of interactive components 110 comprises an interaction event handler 118. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 108. For example, links to decentralized platforms as described in this disclosure may be incorporated using icons. Using an icon may be a fast way to open documents, run programs etc. because clicking on them yields instant access.

With continued reference to FIG. 1, as used in this disclosure, a "visual element" is a component or feature within a system, display, or interface that conveys information through visual means. In a non-limiting example, the visual element 106 may include text, images, icons, shapes, colors, and/or other graphical components designed to be perceived by the user. In a non-limiting example, the visual element 106 may aid in communication, navigation, and/or interaction with the system. Without limitation, the visual element 106 may be used to enhance user experience, guide behavior, and/or represent data visually in an intuitive or informative way. A visual element 106 may include any data transmitted to display device, client device, and/or graphical user interface 108. In some embodiments, visual element 106 may be interacted with. For example, visual element 106 may include an interface, such as a button or menu. In some embodiments, visual element 106 may be interacted with using a user device such as a smartphone, tablet, smartwatch, or computer.

With continued reference to FIG. 1, as used in this disclosure, an "interaction event handler" is a function or mechanism within an interactive component of a graphical user interface that responds to user interactions. User interactions may include clicks, taps, or keystrokes. Continuing, each interaction event handler 118 may be designed to detect specific user actions and trigger a predefined response or function in the apparatus, facilitating a seamless user experience and enabling dynamic updates to the GUI 108. In a non-limiting example, an interaction event handler 118 may be associated with a "Submit" button and may be configured to process and validate the input 120 when the button is clicked, then transmit the data to the server or display a confirmation message on the GUI 108. Event handlers play a crucial role in GUIs by enabling interactivity, processing user commands in real time, and ensuring that the system responds appropriately to various types of user input.

Still referring to FIG. 1, processor 102 is configured to display, using the graphical user interface 108, at least a command 116 corresponding to an interactive component. As used in this disclosure, a "command" is an instruction or directive given to a person, system, device, and/or process to perform a specific action or task. Without limitation, the command may initiate an operation, alter system behavior, or trigger a response, and may be issued manually by a user or automatically by a program or system. In a non-limiting example, the command may control hardware functions, execute software routines, or interact with external systems, and may be part of a sequence within the plurality of command input event handlers. In a non-limiting example, the command may be awaiting execution or confirmation from a user. In a non-limiting example, the plurality of command input event handlers may function as a checklist where each command or task may be processed, executed, or marked as completed by the user or system. As used in this disclosure, an "interactive component" is an element within a graphical user interface that enables users to engage actively with the system by selecting, entering, or manipulating data. Without limitation, the interactive component may respond to user actions, such as clicks, taps, or typed inputs, and facilitate a two-way exchange between the user and the apparatus 100, by triggering commands or displaying real-time feedback. In a non-limiting example, the interactive component might include buttons, sliders, dropdown menus, checkboxes, or text input fields on the GUI 108. Without limitation, the interactive component may allow users to input specific instructions, adjust settings, or provide responses that the apparatus 100 processes to execute associated commands or update displays in response to user needs. For instance, a button labeled "Evaluate Safety" in a rehabilitation safety GUI may be an interactive component that, when clicked, triggers an assessment routine and displays relevant recommendations based on current patient data.

Still referring to FIG. 1, processor 102 is configured to detect, using an event handler 118 of a plurality of event handlers, input 120 corresponding to a reference datum 122 of the at least a command 116. An "event handler," as used in this disclosure, is a module, data structure, function, and/or routine that performs an action in response to an event. For instance, and without limitation, an event handler 118 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 118 may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, "input" is user-provided data or commands that are entered into a user interface to interact with a system. Without limitation, the input 120 may include information related to performing a safety evaluation in a rehabilitation unit. Without limitation, input 120 may be provided in various types, formats, and the like. In a non-limiting example, the input 120 may include text input. For example, without limitation, the text input may be entered in the form of free-form text fields, dropdown menus, checkboxes, and the like. In In a non-limiting example, a user may input a patient's medical condition, specify the type of injury, or select relevant risk factors such as fall risk or mobility issues from a predefined list. Without limitation, the input 120 may be numerical input. For example, without limitation, the numerical input may be provided using number fields or sliders. Continuing, a user may input a patient's mobility score, rate their pain level, or indicate the number of falls that occurred within a set time frame. In another non-limiting example, the input 120 may include selection include selection input. For example, without limitation, selection input may include a user selecting from multiple-choice options, radio buttons, checkboxes, and the like. For example, without limitation, the user may choose the type of rehabilitation therapy (e.g., physical or occupational therapy) and/or select specific safety protocols that need to be evaluated, such as the use of assistive devices or environmental safety measures. In another non-limiting example, the input 120 may include a date and or a time input. In a non-limiting example, the date and or time input may be added using a calendar picker or time selector. Continuing, the user may input the date of a patient's last evaluation or schedule upcoming assessments. In another non-limiting example, the graphical user interface 108 may include a file upload element where a user may upload patient records, safety compliance reports, images of equipment used in the rehab unit, and the like.

As used in this disclosure, a "reference datum" is baseline information that is used as a standard or benchmark for comparison, analysis, and/or validation within a system. Without limitation, reference datum 122 may include values, rules, and/or guidelines that remain relatively static and provide context for interpreting inputs, system operations, and/or other variable data. For example, without limitation, reference datum 122 may include established safety standards, regulatory requirements, or recommended best practices against which a rehabilitation facility's safety measures are assessed. In a non-limiting example, reference datum 122 may include specific building codes and/or regulations mandated by health and/or safety authorities. For instance, without limitation, reference datum 122 may contain the minimum required specifications for door locks in patient rooms, such as guidelines stating that doors must have anti-barricade locks. Continuing, the reference datum 122 may serve as a benchmark when evaluating the facility's compliance, allowing the apparatus 100 to compare the current door installations with the safety standards and flag any deviations. In another non-limiting example, the reference datum 122 may include the use of patient-safe fixtures in rehabilitation environments. Continuing, the reference datum 122 may define the characteristics of approved fixtures, such as non-looping door handles, and/or specific material standards designed to minimize the risk of harm. Without limitation, when the apparatus 100 reviews the facility's existing fixtures, it may cross-reference input 120 from the user (e.g., descriptions of door handles or bed frames) with the reference datum 122 to determine whether the installed fixtures meet the safety guidelines. Without limitation, any non-compliant fixtures may trigger a suggestion for replacements based on the reference datum 122. Additionally and/or alternatively, fire safety requirements may serve as another key set of reference datum 122. Continuing, this may include reference datum 122 associated with the installation of smoke detectors, fire alarms, and/or sprinkler systems, as well as guidelines for evacuation routes in a rehabilitation facility. Continuing, as part of the safety evaluation process, the apparatus 100 may compare the facility's current fire safety measures (input by the user) with the reference datum 122 to ensure compliance with fire safety codes. Continuing, if discrepancies are found, such as missing smoke detectors or insufficient exit signage, the apparatus 100 may provide recommendations based on the reference datum 122.

Still referring to FIG. 1, processor 102 is configured to determine, using a tracking module 124, interaction data 126 corresponding to input 120. As used in this disclosure, a "tracking module" is a software component or subroutine within the system designed to monitor, collect, and/or process user interactions with the graphical user interface 108. In a non-limiting example, the tracking module 124 may work with the processor 102 to determine interaction data 126 related to input 120 provided by the user. Continuing, the interaction data 126 may include details such as user selections, input patterns, modifications made to specific elements within the graphical user interface 108, and the like. Without limitation, the tracking module 124 collected data may be used by processor 102 to dynamically update the graphical user interface 108, as described in FIG. 1, by adjusting the visual element 106 in response to user inputs. Continuing, the updates may be carried out as a function of predefined data 132 (e.g., reference guidelines, rules) and the collected interaction data 126. Continuing, this may help ensure that the modified interface reflects the current state of the user's interaction with the system. Continuing, this process may allow the apparatus 100 to provide a more personalized and adaptive user experience, based on real-time user behavior and input patterns.

With continued reference to FIG. 1, as used in this disclosure, "interaction data" is information associated with the actions of a user while interacting with a system's graphical user interface 108. Without limitation, interaction data 126 may include various aspects of the user's behavior, including but not limited to, selections made, inputs provided, navigation patterns, clicks, hovers, or any other form of engagement with the visual element 106 of the interface. For instance, without limitation, if a user clicks a button, enters text into a field, or selects an item from a dropdown menu, these actions may generate interaction data 126. Continuing, the interaction data 126 may serve as a record of how the user engages with the system. Without limitation, the interaction data 126 may be used by the tracking module 124 to inform subsequent updates or modifications to the graphical user interface 108. In a non-limiting example, tracking the interaction data 126 may enable the apparatus 100 to respond dynamically to inputs which may help improve the user experience by making the graphical user interface 108 more intuitive, adaptive, and personalized based on real-time actions.

With continued reference to FIG. 1, in another non-limiting example, the graphical user interface 108 may present a plurality of commands, such as a rehab safety evaluation checklist. Continuing, when a user begins interacting with the checklist by selecting an item, such as "Check wheelchair accessibility," the tracking module 124 may collect interaction data 126 related to this action. Continuing. the interaction data 126 may include the specific item selected, the time spent on the selection, and any additional notes the user provides in a text field. Continuing, based on the interaction data 126, processor 102 may dynamically update the GUI to reflect the user's current progress. For example, after the "Check wheelchair accessibility" item is selected, the interface could automatically expand additional sections related to accessibility, such as "Verify proper installation of grab bars" or "Assess floor surface for slip resistance." Continuing, the system may also highlight or reorder checklist items based on user input patterns, suggesting the next logical steps based on pre-defined safety guidelines or frequently performed tasks. Additionally and/or alternatively, if the interaction data 126 indicates that the user has marked several items as "Requires Attention," the graphical user interface 108 may adjust by displaying a summary section that aggregates all flagged items for further review, potentially providing links to relevant guidelines or recommended actions for each flagged item. Continuing, this process may ensure that the graphical user interface 108 remains adaptive and aligns with the evolving state of the user's evaluation, enhancing the overall efficiency and personalization of the rehab safety assessment.

With continued reference to FIG. 1, in another non-limiting example, the graphical user interface 108 for a rehab safety evaluation may include one or more tools for the user. For example, without limitation, the tools may include a "Measurement Tool" for assessing room dimensions, a "Checklist Tool" for marking safety items, and an "Annotations Tool" for adding notes to specific areas. Continuing, the tracking module 124 may collect interaction data 126 that indicates the user frequently uses the "Measurement Tool" more than any other feature. Continuing, the interaction data 126 may include the frequency of use, the duration of engagement with the tool, and the specific contexts in which it is utilized. Without limitation, the processor 102 may dynamically update the graphical user interface 108 to make the "Measurement Tool" more accessible and visually prominent. For instance, without limitation, the icon for the "Measurement Tool" may be moved to a more intuitive location on the screen, such as the top toolbar or a quick-access sidebar. Additionally and/or alternatively, the icon may be made larger or highlighted with a different color to draw attention to it, reflecting its importance based on the user's behavior. Continuing, the system may display a tooltip indicating that it is a "Frequently Used Tool," reinforcing its relevance. As used in this disclosure, a "tooltip" is an informative box that appears when a user hovers over, clicks on, or interacts with a specific element on a graphical user interface 108. Without limitation, the tooltip may provide additional information or context about the item the user is engaging with, often displaying brief descriptions, instructions, tips related to that element, and the like. For example, if the user hovers over the at least a command 116, a tooltip may appear with a definition or explanation of the safety measure being evaluated. Continuing, the tooltip may help users understand functions or terms without leaving the current screen, enhancing the usability and intuitiveness of the interface. Without limitation, the adjustments may make the interface more adaptive by prioritizing elements that align with the user's preferences, resulting in a more personalized and efficient user experience. Continuing, by responding to real-time patterns in the user's actions, the graphical user interface 108 may evolve to meet the user's needs, reducing the effort required to access commonly used features.

With continued reference to FIG. 1, the interaction data 126 may include a selection datum 128 corresponding to the visual element 106 of the at least a command 116. As used in this disclosure, a "selection datum" is a specific piece of data that indicates a user's choice or selection made within a graphical user interface 108. In a non-limiting example, the selection datum 128 may include details of a user's action when they select a particular option, button, checkbox, menu item, or any other interactive element in the interface. For instance, without limitation, a selection datum 128 may be generated when a user selects an item from a checklist, such as "Verify proper use of assistive devices." Without limitation, the selection datum 128 may record the selection as an event, allowing the apparatus 100 to track user preferences, inputs, or patterns of interaction. Without limitation, the selection datum 128 may be used to adapt the graphical user interface 108 or inform subsequent system processes.

Still referring to FIG. 1, processor 102 is configured to generate a modified graphical user interface 130 by dynamically updating the visual element 106 in the graphical user interface 108 in response to input 120 as a function of predefined data 132 and the interaction data 126. As used in this disclosure, a "modified graphical user interface" refers to a user interface that has been dynamically updated. In a non-limiting example, the modified graphical user interface 130 may be updated based on user interactions, system processes, and/or other inputs, and the like. In a non-limiting example, the modified graphical user interface 130 may include changes to the visual element 106, layout, and/or content displayed within the interface, making the experience more relevant and responsive to the user's current actions or context. For example, without limitation, the graphical user interface 108 may be modified to display additional options, adjust the layout, highlight specific sections of text, and the like based on the data collected from user selections or interaction patterns.

With continued reference to FIG. 1, dynamically updating the visual element 106 may include modifying a format datum 134 associated with the command. As used in this disclosure, a "format datum" is a specific piece of data that defines the visual presentation or styling attributes associated with a particular visual element 106 within a graphical user interface 108. In a non-limiting example, the format datum 134 may include changing characteristics such as font style, color, size, alignment, layout properties, and the like, that are associated with the at least a command 116 or the user interaction. For instance, without limitation, if the command requires highlighting a safety-related alert, the format datum 134 may be modified to make the text bold, change its color to red, increase its size to draw attention, and the like. Continuing, these changes may adjust the appearance of the visual element 106 based on user inputs or predefined conditions, making the interface more responsive and informative.

With continued reference to FIG. 1, dynamically updating the visual element 106 may include rearranging the visual element 106 corresponding to the command. In a non-limiting example, dynamically updating the visual element 106 by rearranging it may include modifying the layout of the at least a command 116 which may, for example, include a safety checklist in a rehabilitation evaluation interface. Continuing, input 120 may include the user marking certain items as "High Priority." Continuing, the apparatus 100 may then rearrange the visual element 106 by moving the "High Priority" items to the top of the list. Without limitation, rearranging the "High Priority" items to the top of the list may ensure that the most critical tasks appear prominently and are easy to access. Continuing, rearrangement may improve the user experience by prioritizing the at least a command 116 based on their urgency, allowing the user to address important safety concerns more efficiently.

With continued reference to FIG. 1, in another non-limiting example dynamically updating the visual element 106 may include a dashboard displaying various performance metrics related to rehab safety compliance. For example, without limitation, the user may select a specific metric, such as "Equipment Inspections," and the interface may rearrange the dashboard to place detailed inspection data at the forefront. Continuing, additional related metrics, like "Maintenance Requests" or "Equipment Usage," may be dynamically clustered around the selected element to provide context. Continuing, this rearrangement may help the user focus on the most relevant information while still presenting supporting data for a comprehensive view of the situation.

In another non-limiting example, the apparatus 100 may rearrange visual element 106 when the user activates a filtering command to sort data by category, such as "Environmental Hazards" or "Patient Mobility." Continuing, the graphical user interface 108 may respond by dynamically grouping related checklist items or data fields according to the selected category, changing their order on the graphical user interface 108 to match the user's filter criteria. Without limitation, the modified graphical user interface 130 may make it easier for the user to perform category-specific evaluations, as all relevant elements are organized together, reducing the time and effort needed to navigate the graphical user interface 108.

Additionally and or alternatively, the apparatus 100 may rearrange the visual element 106 corresponding to the command when an action is issued to expand a particular section of a form or checklist. For instance, without limitation, if a user selects "Fall Prevention Measures," the apparatus 100 may automatically rearrange the interface by moving the "Fall Prevention" section to a more prominent position on the screen while collapsing or shifting other less relevant sections further down. Continuing, this dynamic update may streamline the workflow by bringing the most pertinent information to the user's attention at the right moment.

In another non-limiting example, rearranging the visual element 106 may include modifying the order of the at least a command 116, such as steps, in a guided safety evaluation process based on user progress or input patterns. For example, without limitation, if the apparatus 100 detects that certain steps have already been completed or that some areas need more attention, the apparatus 100 may rearrange the sequence of the steps shown on the screen. Continuing, steps that require more focus may be moved forward, while completed or less critical steps may be shifted to a later position. Continuing, the dynamic updates of the graphical user interface 108 may ensure that the evaluation process remains aligned with the user's needs, optimizing the order of tasks to enhance efficiency.

With continued reference to FIG. 1, an interface simulator 136 may be configured to generate the modified graphical user. As used in this disclosure, an "interface simulator" is an algorithm or artificial intelligence system configured to dynamically update the graphical user interface 108 based on changes in input or system state. Without limitation, the interface simulator 136 may modify the visual element 106 and/or interactive elements of the graphical user interface 108 in real-time, adapting to input, new data, user actions, and/or other system events. Continuing, the dynamic update allows for a responsive and evolving user interface experience, where the appearance and functionality of the interface can be automatically adjusted to optimize user interaction or reflect system updates.

With continued reference to FIG. 1, the interface simulator 136 may be trained using simulator training data 138 comprising historical interaction data 140 and historical predefined data 142 corresponding to historical graphical user interface configurations. As used in this disclosure, "simulator training data" is a dataset used to teach and optimize the performance of the interface simulator 136. Without limitation, the simulator training data 138 may include various forms of input that help the simulator learn to update or modify the graphical user interface 108 effectively. For example, without limitation the simulator training data 138 may provide examples of different scenarios and responses that the interface simulator 136 can use to improve its accuracy and adaptability. As used in this disclosure, "historical interaction data" is past records of user interactions with the graphical user interface 108. Without limitation, the historical interaction data 140 may include information such as user clicks, navigation paths, input entries, or any other actions taken by users within the interface. Continuing, the historical interaction data 140 may serve as a valuable source for understanding typical user behaviors, preferences, and common tasks, which may inform how the interface simulator 136 predicts and responds to user actions and updates the graphical user interface 108. As used in this disclosure, "historical predefined data" are the user settings or configurations that have been established in the past and remain consistent throughout the use of a dynamic graphical user interface 108. Continuing, these settings may serve as baseline parameters or default preferences that guide the behavior and appearance of the graphical interface, ensuring a consistent user experience. Without limitation, the historical predefined data 142 may include elements like layout preferences, default options, personalized settings, and the like, that persist across various updates or dynamic changes to the graphical user interface 108, helping the interface simulator 136 maintain familiarity for the user while still allowing for real-time adaptations. As used in this disclosure, "historical graphical user interface configuration" are prior setups or arrangements of the graphical user interface 108. Without limitation, the historical graphical user interface configuration may include layout design, component placements, functional settings, and the like, that were used in previous versions of the graphical user interface 108. Without limitation, the historical graphical user interface configuration may help the interface simulator 136 understand how the graphical user interface 108 has evolved over time and may be used to predict future changes or adapt the current interface based on historical patterns.

With continued reference to FIG. 1, the interface simulator may be further trained using a score assigned to the modified graphical user interface. As used in this disclosure, a "score" refers to a quantitative measure that assesses the effectiveness of the updated GUI in facilitating user inter-action. Without limitation, the score may reflect factors such as the efficiency of user navigation, indicating whether the modified GUI improved the user's time navigating through interface elements, or whether it hindered efficiency, result-ing in prolonged navigation times. Continuing, the score may serve as a feedback mechanism, enabling the interface simulator to analyze and incorporate improvements in GUI design, with the goal of optimizing user experience and minimizing the average time required to complete tasks within the interface.

With continued reference to FIG. 1, the modified graphical user interface is assigned the score as a function of a user navigation metric. As used in this disclosure, a "user navi-gation metric" refers to a quantitative measure that captures specific aspects of a user's interaction and movement through a graphical user interface (GUI). Without limitation, the user navigation metrics may include data points such as the average time spent on a page, the sequence of pages accessed, the number of clicks or interactions per page, frequency of backtracking, and the directness of the path taken to complete a task. Continuing, these metrics may provide insights into the ease, efficiency, and intuitiveness of the GUI, offering valuable information for assessing and improving user experience within the interface. In a non-limiting example, the apparatus 100 may gather and quantify the user navigation metric by employing several data collection and analysis techniques within the modified graphi-cal user interface. For example, the apparatus 100 may integrate event-tracking mechanisms to record each user interaction, capturing details such as clicks on buttons or links, page transitions, form interactions, mouse movements, and scrolling behaviors. Continuing, these interac-tions may be timestamped, allowing the apparatus 100 to calculate how long a user spends on each page or element, resulting in metrics like average time per page, total comple-tion time for tasks, and time on specific interactive elements. Additionally and or alternatively, by analyzing the sequences of pages that users navigate through (user paths), the apparatus 100 may evaluate how closely a user follows an efficient route, identifying any backtracking or deviations that may suggest usability issues. Without limitation to visualize interaction frequency and attention areas within the modified GUI 130, the apparatus 100 may generate heat-maps, highlighting regions of high and low interaction, which may provide insights into usability strengths and areas with discoverability issues. Continuing, after collecting this navigation data, the apparatus 100 may quantify it by assigning a score to the modified GUI, based on several metrics, such as an efficiency score derived from average navigation times and path efficiency, a usability score based on backtracking and time spent on interactive elements, and an engagement score that captures user interaction fre-quency with GUI elements. Additionally and or alterna-tively, machine learning analysis, as discussed herein, may be used to identify patterns in user interactions, further refining the score and enhancing the apparatus's ability to evaluate and improve the GUI 108 for optimized user navigation efficiency.

With continued reference to FIG. 1, the apparatus 100 may include a large language model 144 which may be configured to receive input 120, process the input 120, wherein processing the input 120 comprises identifying actionable insights 148, and generate an output 146 based on the actionable insights 148, wherein the apparatus 100 is further configured to generate the modified graphical user interface using the output. "Output," as used in this disclo-sure, is the information, data, or response generated by the large language model 144 after processing the received input. Without limitation, the output 146 represents the result of analyzing input 120 and may take various forms, such as text responses, recommendations, changes to a graphical user interface 108, or other relevant information produced by the system. As used in this disclosure, "action-able insights" are information or data derived from analysis, processing, or evaluation that can directly inform and guide decisions, interventions, or follow-up actions. Without limi-tation, the actionable insights 148 may be tailored to provide clear, practical recommendations or steps that may be imple-mented to achieve specific outcomes, improve processes, or address identified needs. Without limitation, actionable insights 148 may include alerts, suggested next steps, pri-oritized tasks, or data-driven recommendations that enhance the effectiveness or efficiency of a system or workflow.

With continued reference to FIG. 1, in a non-limiting example, the large language model 144 may be configured to process input in a safety evaluation context, such as a note saying, "tested the emergency system and need to call fire department," and may handle data through a series of processing steps tailored to safety and compliance contexts. Continuing, the LLM 144 may interpret keywords like "tested," "emergency system," and "call fire department" to identify the critical elements of the input 120. Continuing, this may allow the LLM 144 to categorize the input 120 as a safety action report that may require immediate attention or follow-up actions. Without limitation, the LLM 144 may use natural language processing (NLP) to determine that "tested the emergency system" suggests a completed safety check, while "need to call fire department" indicates an action that may still need completion. Without limitation, the LLM 144 may then cross-reference this information with safety protocols or the rehab facility's standard operating procedures to evaluate if further steps may be necessary based on the findings reported. Without limitation, the LLM 144 may prioritize the input 120 as needing follow-up and may generate an output 146 that prompts relevant personnel to act. Continuing, the output 146 may include a summary response, such as "Action noted: Emergency system was tested; follow-up with the fire department is recommended for compliance," or may generate automated alerts or task assignments within the graphical user interface 108, tagging departments or individuals who may need to follow up. Additionally, the LLM 144 may make contextual updates in the GUI 108, marking the task as "action required" or "pending follow-up" to ensure visibility and accountability. Continuing, the LLM 144 may customize the output 146 to integrate directly with the GUI 108 to update checklists or create log entries with additional guidance. For example, the GUI 108 may automatically update to show the emergency system test as "Complete" and may add a new task "Call Fire Department" with an open status indicator. It may also provide textual guidance, such as "Fire department notifi-cation is required within 24 hours to comply with facility protocols." Without limitation, the LLM 144 may support a responsive, compliance-oriented approach that ensures all critical steps in the safety evaluation process are documented and addressed according to the facility's standards.

With continued reference to FIG. 1, a "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, nonlimiting examples, medical report documents, electronic health records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Where can I", then it may be highly likely that the word "find" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with safety evaluation for a rehab unit.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, the large language model 144 may be trained using a training dataset 150 comprising historical input 152 associated with historical output 154. As used in this disclosure, "training dataset" is a collection of data used to train a large language model. In a non-limiting example, the training dataset 150 may include various examples or records that help the large language model 144 learn patterns, relationships, and/or generate accurate responses. Without limitation, the training dataset 150 may include historical input 152 and their corresponding historical output 154, allowing the large language model 144 to understand how different inputs relate to specific outcomes. As used in this disclosure, "historical input" is past instances of data or information that were previously provided to the system or model. Without limitation, historical input 152 may consist of text, commands, or other forms of data that the large language model 144 encountered during training. In a non-limiting example, historical input 152 may serve as a reference for understanding how future inputs should be processed. As used in this disclosure, "historical output" refers to the responses or results that were previously generated by the apparatus 100 based on the historical input 152. In a non-limiting example, historical output 154 is data that represents the outcome of processing the historical input 152 and serves as an example of expected behavior or responses in similar future scenarios, guiding the training of the large language model 144.

With continued reference to FIG. 1, the historical input 152 may include user-submitted text or commands, such as specific safety concerns, equipment details, or patient mobility conditions entered into the GUI. For example, without limitation, input 120 may include a text entry specifying "check wheelchair brake function" or "evaluate fall risks in common areas." Continuing, the historical output 154 may include the corresponding system responses or actions, such as "inspection scheduled for wheelchair brakes" or "recommend installation of additional handrails." Without limitation, by using these historical input 152 and outputs, the large language model 144 may learn to generate accurate responses tailored to similar future safety evaluation requests, improving the efficiency and consistency of the safety assessment process in the rehabilitation unit.

With continued reference to FIG. 1, generating the modified graphical user interface 130 may include classifying, using a classifier, the command as a function of a classification datum 158. wherein the classification datum is used to dynamically adjust displayed content based on the command. As used in this disclosure, a "classifier" is an algorithm, model, or component within a system that categorizes or assigns labels to data or commands based on predefined criteria or learned patterns. In a non-limiting example, the classifier may analyze input data, such as user input, and determine which category or classification input 120 data belongs to, based on its features or characteristics. In a non-limiting example, the classifier may evaluate the command in relation to a classification (such as input 120) and may assign it to a corresponding category or function. Continuing, the classification process may help the apparatus 100 organize and process user input, enabling more accurate and context-aware modifications to the graphical interface. As used in this disclosure, a "classification datum" is information that is designated or identified within the system for use in performing a specific function. For example, without limitation, the classification datum 156 may provide information for the classification, analysis, and/or modification of a graphical user interface 108. Without limitation, the classification datum 156 may include input and/or other relevant information that serves as a reference for evaluating commands or actions. In a nonlimiting example, the classifier may evaluate the command in relation to the classification datum 156, enabling the system to categorize the command appropriately based on its relationship to this key piece of data. Continuing, this may help ensure that the graphical user interface 108 is updated or modified in a way that is relevant and aligned with the user's needs or system requirements.

With continued reference to FIG. 1, the classifier 156 is trained using classifier training data 160 may include historical classification data 162 corresponding to historical commands 164. As used in this disclosure, "classifier training data" refers to a dataset used to teach or improve the performance of a classifier 156. Without limitation, classifier training data 160 may include input-output pairs that the classifier 156 analyzes to learn how to accurately categorize or classify new data. Without limitation, the classifier training data 160 may allow the classifier 156 to recognize patterns in user commands and corresponding system responses, refining its ability to classify commands in future interactions. As used in this disclosure, "historical classification data" is previously recorded or stored classification information that serves as a benchmark or standard in the system. Without limitation, the historical classification data 162 may include prior classifications of the classifier 150 and may provide context for the classifier 156. In another non-limiting example, the historical classification data 162 may be used to help the classifier 156 learn from past interactions and improve the accuracy of its classifications based on known outcomes or decisions. As used in this disclosure, "historical commands" are past instances where user commands were processed by the apparatus 100. Without limitation, the past instances of user commands may have been processed by the apparatus 100 specifically through a variety of input event handlers 118. Continuing, the event handlers are mechanisms that capture and respond to user actions, such as button clicks, text inputs, or menu selections, by executing specific commands. Without limitation, the classifier 156 may use the historical commands 164 to understand how similar commands were handled in the past, improving its ability to categorize and manage future user inputs.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
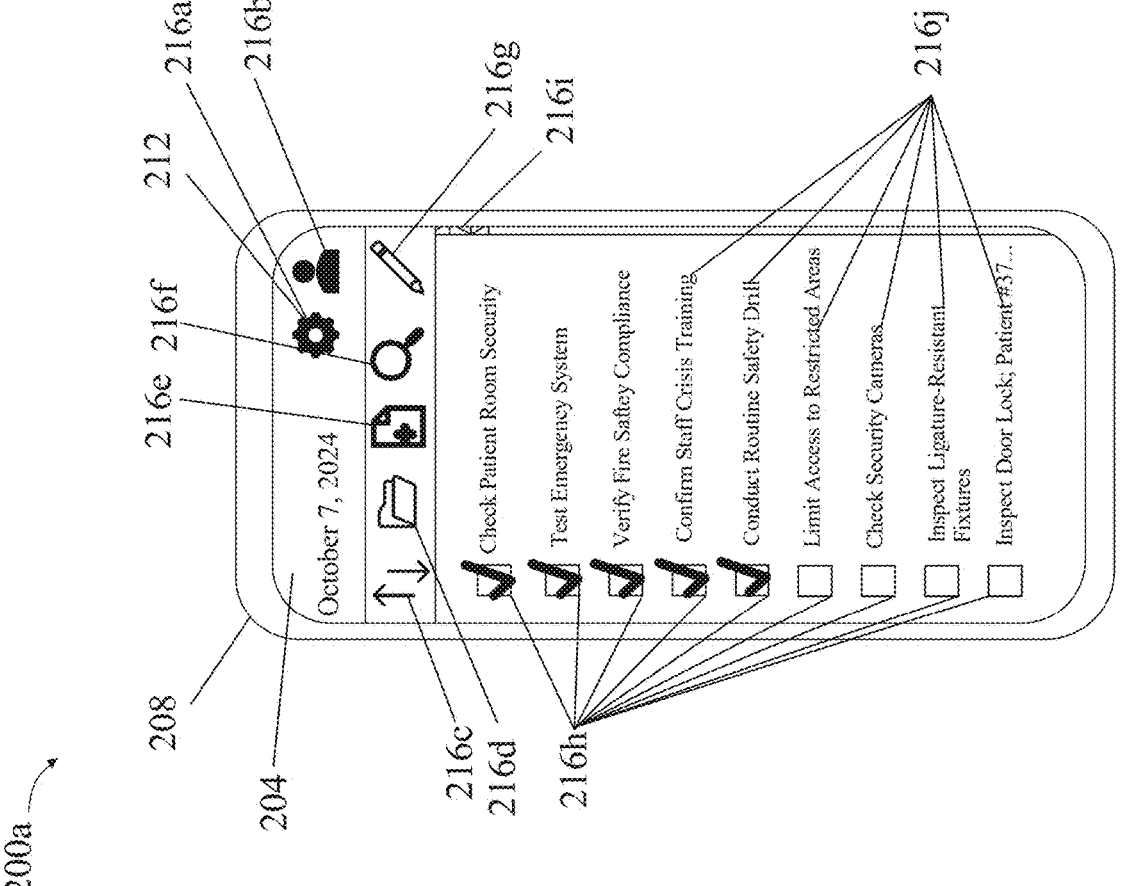
FIG. 2A is an exemplary illustration of a graphical user interface.

Referring now to FIG. 2A, an exemplary illustration 200a of a graphical user interface. In an embodiment, the graphical user interface 204 may be displayed using a downstream device 208. In an embodiment, the graphical user interface 204 may include at least a visual element 212. In an embodiment, the visual element 212 may include an interactive element 216a-m. In an embodiment the interactive element 216a-m may allow a user to engage directly with the graphical user interface 204 through a variety of actions.

In an embodiment, the interactive element 216a-m may include a settings gear 216a, a profile icon 216b, a sorting icon 216c, a folder icon 216d, a new task icon 216e, a find icon 216f, an edit icon 216g, a check box icon 216h, a scroll bar icon216i, text description 216j, and the like.

In an embodiment, the interactive element 216a-m may include a settings gear 216a. In an embodiment, the settings gear 216a may enable users to access the system or application settings where they may modify preferences and configurations. Without limitation, by clicking on the settings gear 216a, users may adjust features like notifications, display options, account details, and the like. In an embodiment, the settings gear 216a may represent control over personalizing the environment within the application. In an embodiment, the settings gear 216a may ensure that users can customize their experience to meet their specific needs.

In an embodiment, the interactive element 216a-m may include a profile icon 216b, which may allow users to access their personal profile settings. In an embodiment, the profile icon 216b may link to a page where users may view and edit their personal information, such as their name, contact details, or profile picture. In an embodiment, the profile icon 216b may make it simple for users to manage their account and view related data quickly. In an embodiment, the profile icon 216b may be placed in a convenient location, allowing easy access to account settings. In an embodiment, the profile icon 216b may help users maintain control over their profile, ensuring that their information stays up-to-date.

In an embodiment, the interactive element 216a-m may include a sorting icon 216c, which may allow users to organize data based on specific criteria. In an embodiment, the sorting icon 216c may be useful when dealing with large datasets or lists that need to be filtered or reordered. Without limitation, by clicking the sorting icon 216c, users may arrange items by various attributes such as date, name, priority, and the like. In an embodiment, the sorting icon 216c may simplify the process of locating specific information, making the interface more efficient to use. In an embodiment, the sorting icon 216c may ensure that users can easily customize how they view and interact with the content.

In an embodiment, the interactive element 216a-m may include a folder icon 216d, which may represent access to a file or document management system. Without limitation, by clicking on the folder icon 216d it may open a directory or list of stored files, allowing users to organize their content within the application. In an embodiment, the folder icon 216d may be essential for managing documents, media, or other file types efficiently. In an embodiment, the folder icon 216d may be associated with file storage and navigation, making it a familiar and intuitive tool for users. In an embodiment, the folder icon 216d may aid in keeping information organized and accessible within the system.

In an embodiment, the interactive element 216a-m may include a new task icon 216e, which may allow users to create or add a new item to their task list or project. In an embodiment, the new task icon 216e may provide a quick way for users to input new assignments or goals, streamlining task management. In an embodiment, the new task icon 216e once clicked, may open a form or prompt where users may specify details about the new task. In an embodiment, the new task icon 216e may help users stay organized by adding tasks efficiently as they arise. In an embodiment, the new task icon 216e may be a valuable tool for productivity, helping users keep track of their to-do lists.

In an embodiment, the interactive element 216a-m may include a find icon 216f, which may function as a search tool for locating specific information within the application. In an embodiment, the find icon 216f may allow users to quickly search through data, files, or content to pinpoint exactly what they need. In an embodiment, the find icon 216f may be especially useful in applications that manage large volumes of information or files. In an embodiment, the find icon 216f may enhance efficiency by reducing the time spent manually browsing through content. Continuing, by providing a fast search function, users may access information more quickly and effectively.

In an embodiment, the interactive element 216*a-m* may include an edit icon 216*g*, which may enable users to modify or update existing content within the application. Continuing, by clicking on the edit icon 216*g*, it may bring users to an editable version of the item, such as a text document, task, or file. In an embodiment, the edit icon 216*g* may allow users to make corrections or updates as needed, maintaining the accuracy of the information. In an embodiment, the edit icon 216*g* may ensure that content remains current and can be easily adjusted as situations or data change. In an embodiment, the edit icon 216*g* may be a crucial tool for users who frequently update or revise their work.

In an embodiment, the interactive element 216*a-m* may include a check box icon 216*h*, which may allow users to select or deselect items in a list or form. In an embodiment, the check box icon 216*h* may be used in task management systems to indicate whether a task has been completed or is still pending. In an embodiment, the check box icon 216*h* may allow a user to click the box to mark items as done or choose multiple options when interacting with a form. In an embodiment, the check box icon 216*h* may simplify user input by providing a clear, visual way to make selections. Check boxes may be intuitive tools for tracking progress or making choices.

In an embodiment, the interactive element 216*a-m* may include a scroll bar icon 216*i*, which may provide users with the ability to navigate through long pages of content. In an embodiment, the scroll bar icon 216*i* may be essential when the content exceeds the available screen space, allowing users to scroll vertically or horizontally. In an embodiment, the scroll bar icon 216*i* may help users move through information at their own pace, ensuring they can access all relevant content. In an embodiment, the scroll bar icon 216*i* may be particularly useful in applications with extensive data, such as documents or databases. In an embodiment, the scroll bar icon 216*i* may enhance the user interface by making navigation simple and intuitive.

In an embodiment, the interactive element 216*a-m* may include a text description 216*j*, which may provide additional information or context about a specific icon or feature. In an embodiment, the text description 216*j* may help users understand the purpose of an icon, making the interface more user-friendly. In an embodiment, the text description 216*j* may be displayed when a user hovers over an icon, providing clarification without cluttering the interface. In an embodiment, the text description 216*j* may improve the usability of the system, particularly for new or unfamiliar users.

Figure 2B:
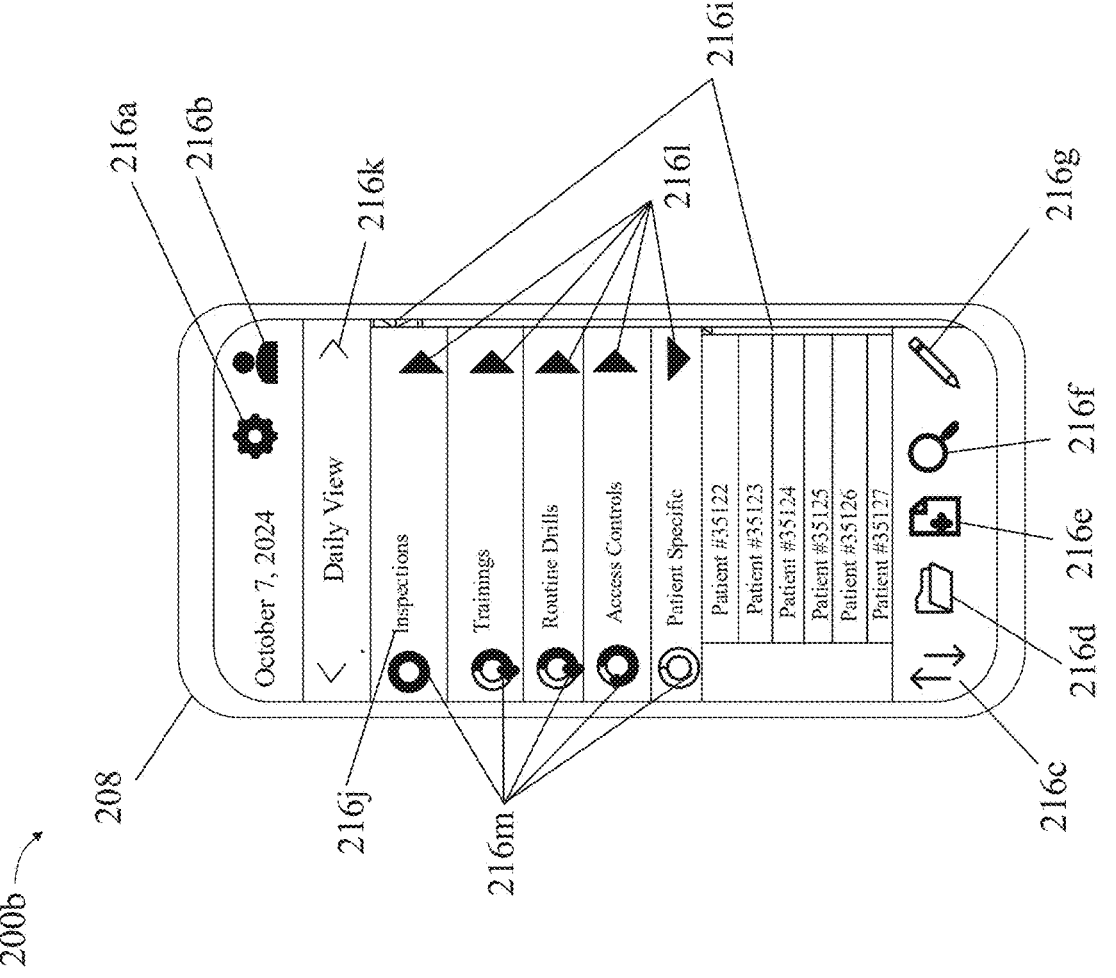
FIG. 2B is an exemplary illustration of a modified graphical user interface.

Referring now to FIG. 2B, an exemplary illustration 200*b* of a modified graphical user interface. In an embodiment, the interactive element 216*a-m* may include an arrow 216*k*. In an embodiment, the arrow 216*k* may serve as a directional indicator, guiding users to scroll, expand sections, or navigate between different pages or sections of the interface. In an embodiment, the arrow 216*k* may point in various directions, depending on its function, and may help improve the flow of user interaction by making navigation more intuitive. In an embodiment, the arrow 216*k* may be used in conjunction with other icons or features, signaling further actions the user may take. In an embodiment, the arrow 216*k* may enhance the overall user experience by making the interface more responsive and easier to use.

In an embodiment, the interactive element 216*a-m* may include a drop down carrot 2161. In an embodiment, the drop down carrot 2161 may indicate the presence of a collapsible or expandable menu, allowing users to click on it to reveal additional options or settings. In an embodiment, the drop down carrot 2161 may be placed beside menu items or sections where further choices or configurations are available. In an embodiment, the drop down carrot 2161 may provide users with a way to hide or display extra content. In an embodiment, the drop down carrot 2161 may contribute to a cleaner, more organized interface. In an embodiment, the drop down carrot 2161 may assist in managing space on the screen, ensuring that users only see relevant information when needed.

In an embodiment, the interactive element 216*a-m* may include a progress circle 216*m*. In an embodiment, the progress circle 216*m* may be used to visually represent the progress of a task, such as a download, file upload, or completion of a process within the application. In an embodiment, the progress circle 216*m* may gradually fill or rotate as the task advances, providing users with real-time feedback on the status of their actions. In an embodiment, the progress circle 216*m* may help users gauge how much time remains for a task or process, reducing uncertainty and improving the overall usability of the system. In an embodiment, the progress circle 216*m* may be a helpful tool for keeping users informed and engaged.

Figure 3:
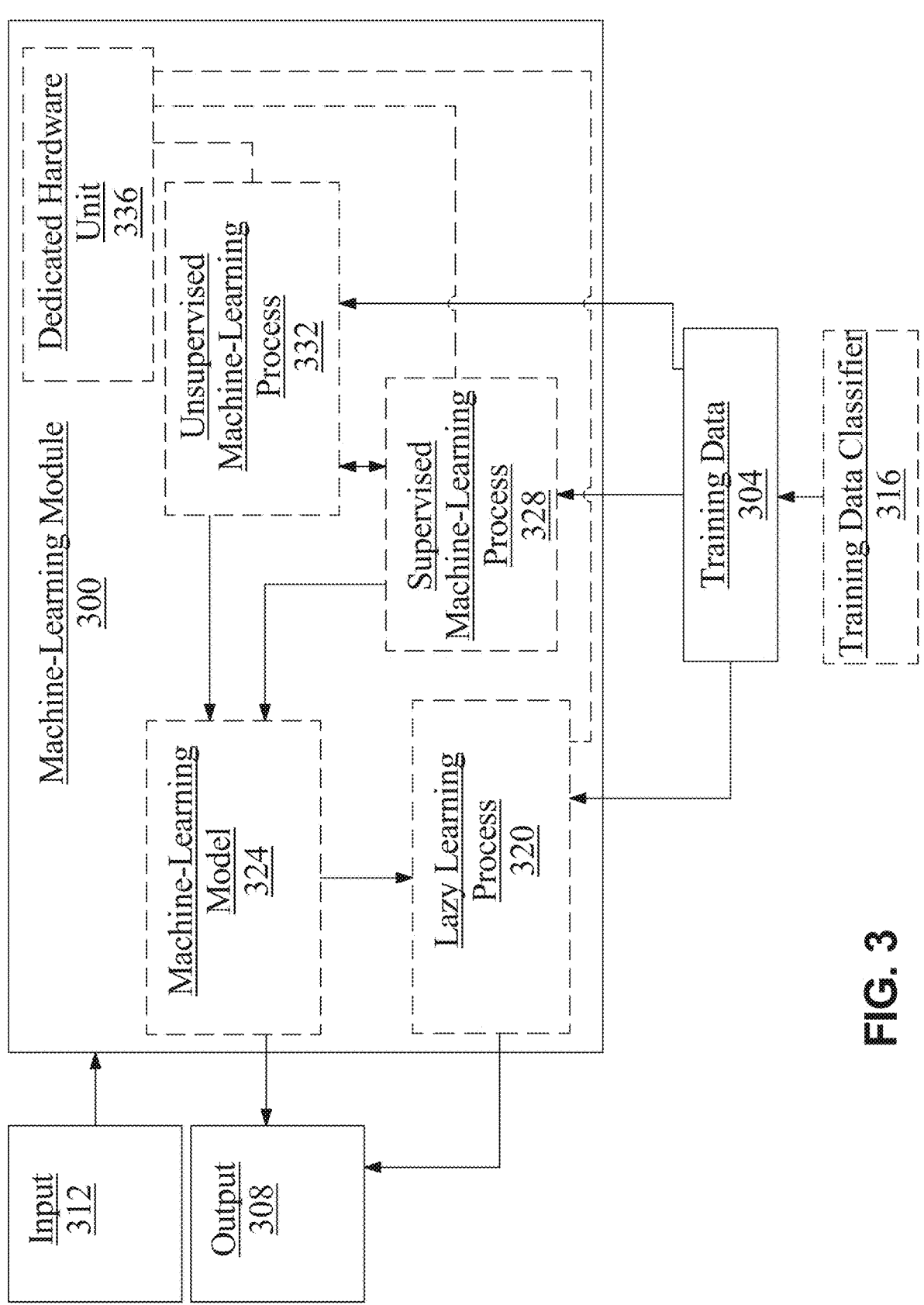
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include at least a command and input and outputs may include the modified graphical user interface.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classifications.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include at least a command and input as described above as inputs, modified graphical user interface as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
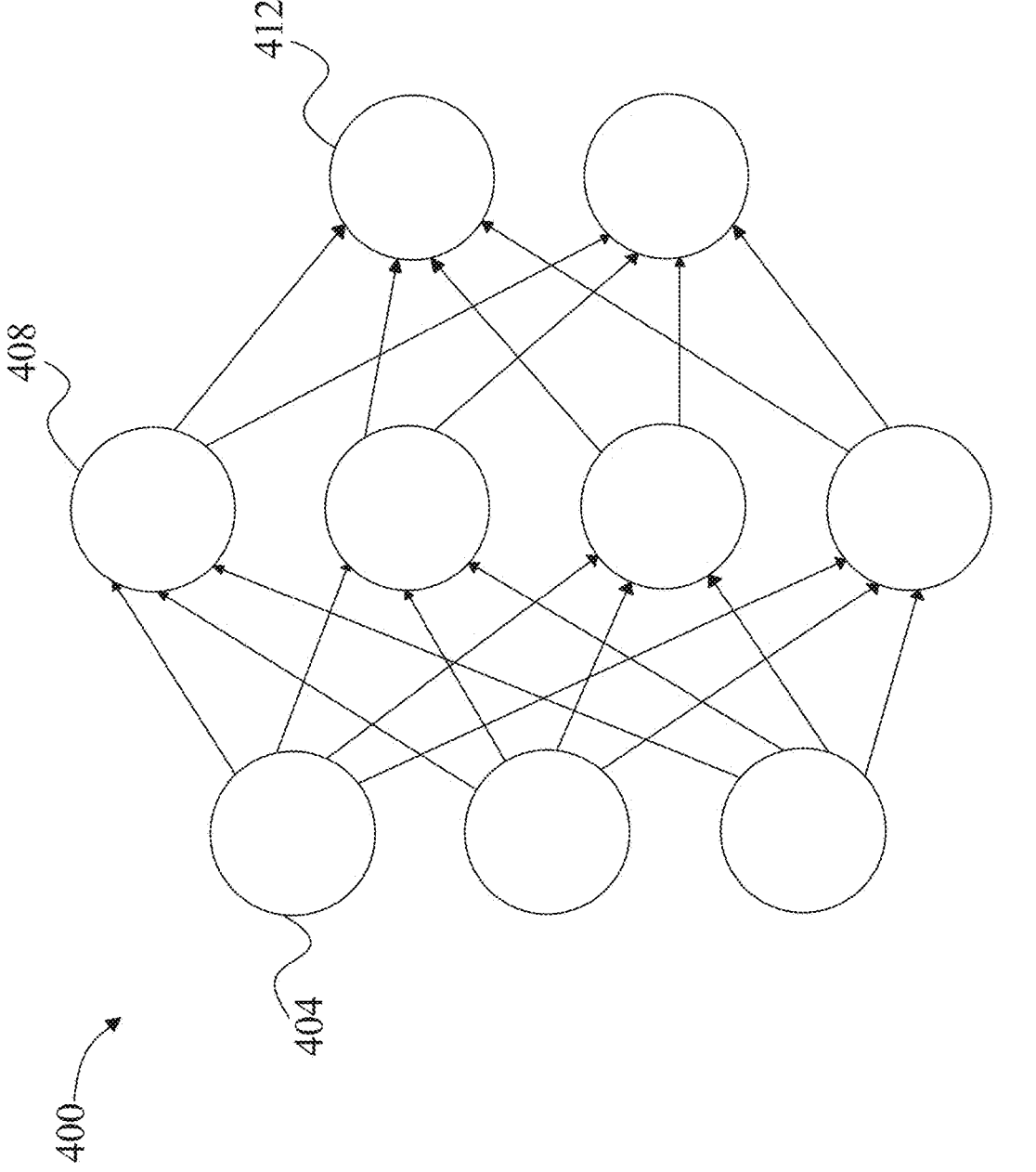
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
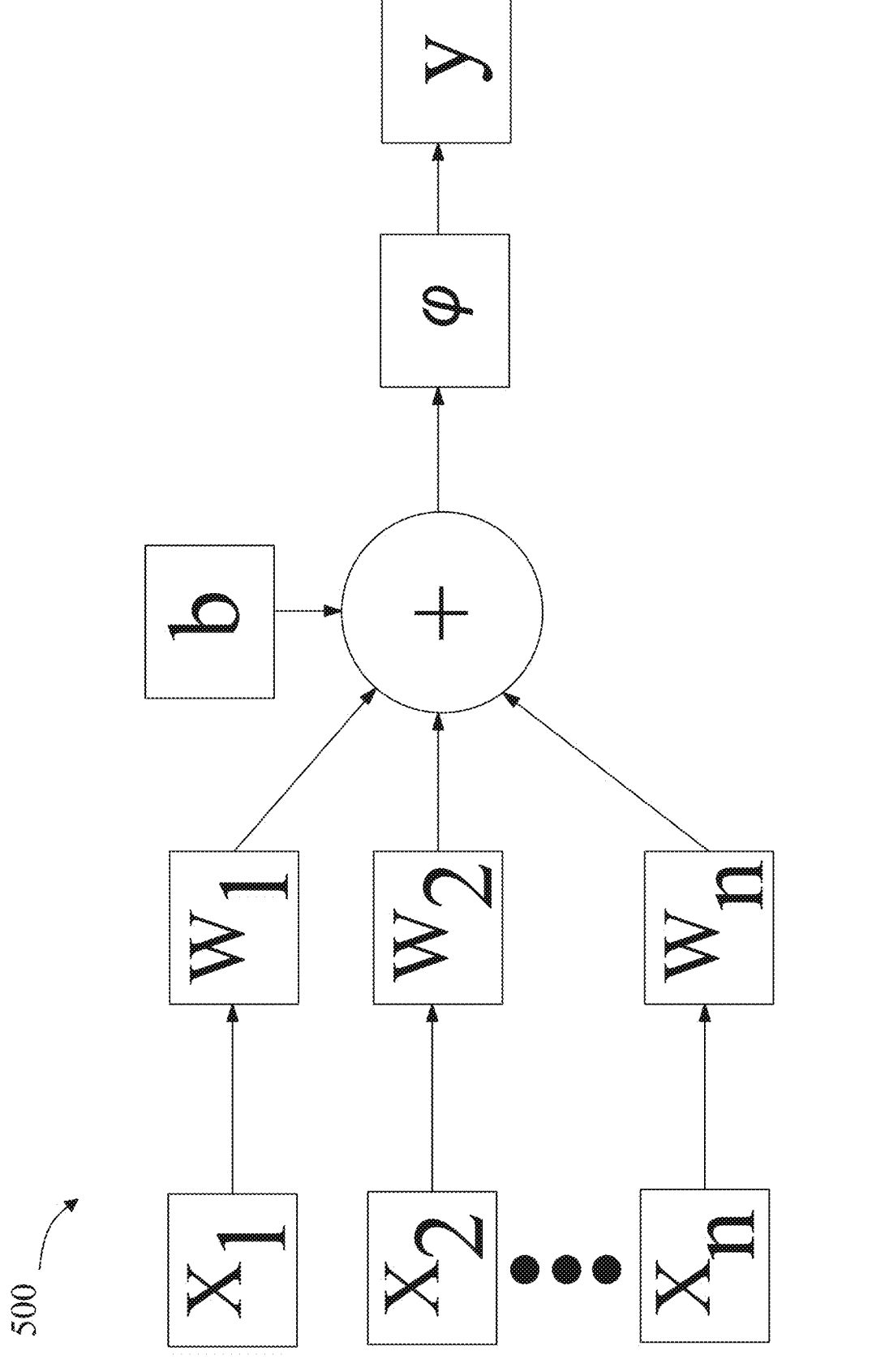
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 6, a flow diagram of an exemplary method 600 for automatically updating a visual element on a graphical user interface is illustrated. At step 605, method 600 includes generating, using at least a processor, a graphical user interface comprising a plurality of visual elements, wherein the plurality of visual elements comprises a plurality of interactive components, wherein each of the plurality of interactive components comprises an interaction event handler. This may be implemented as described and with reference to FIGS. 1-5.

Still referring to FIG. 6, at step 610, method 600 includes displaying, using the graphical user interface, at least a command corresponding to an interactive component. This may be implemented as described and with reference to FIGS. 1-5.

Still referring to FIG. 6, at step 615, method 600 includes detecting, using an interaction event handler of a plurality of interaction event handlers, input corresponding to a reference datum of the at least a command. This may be implemented as described and with reference to FIGS. 1-5.

Still referring to FIG. 6, at step 620, method 600 includes determining, using a tracking module, interaction data corresponding to the input. This may be implemented as described and with reference to FIGS. 1-5.

Still referring to FIG. 6, at step 625, method 600 includes generating, using the at least a processor, a modified graphical user interface by dynamically updating the plurality of visual elements in the graphical user interface in response to the input, predefined data, and the interaction data. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
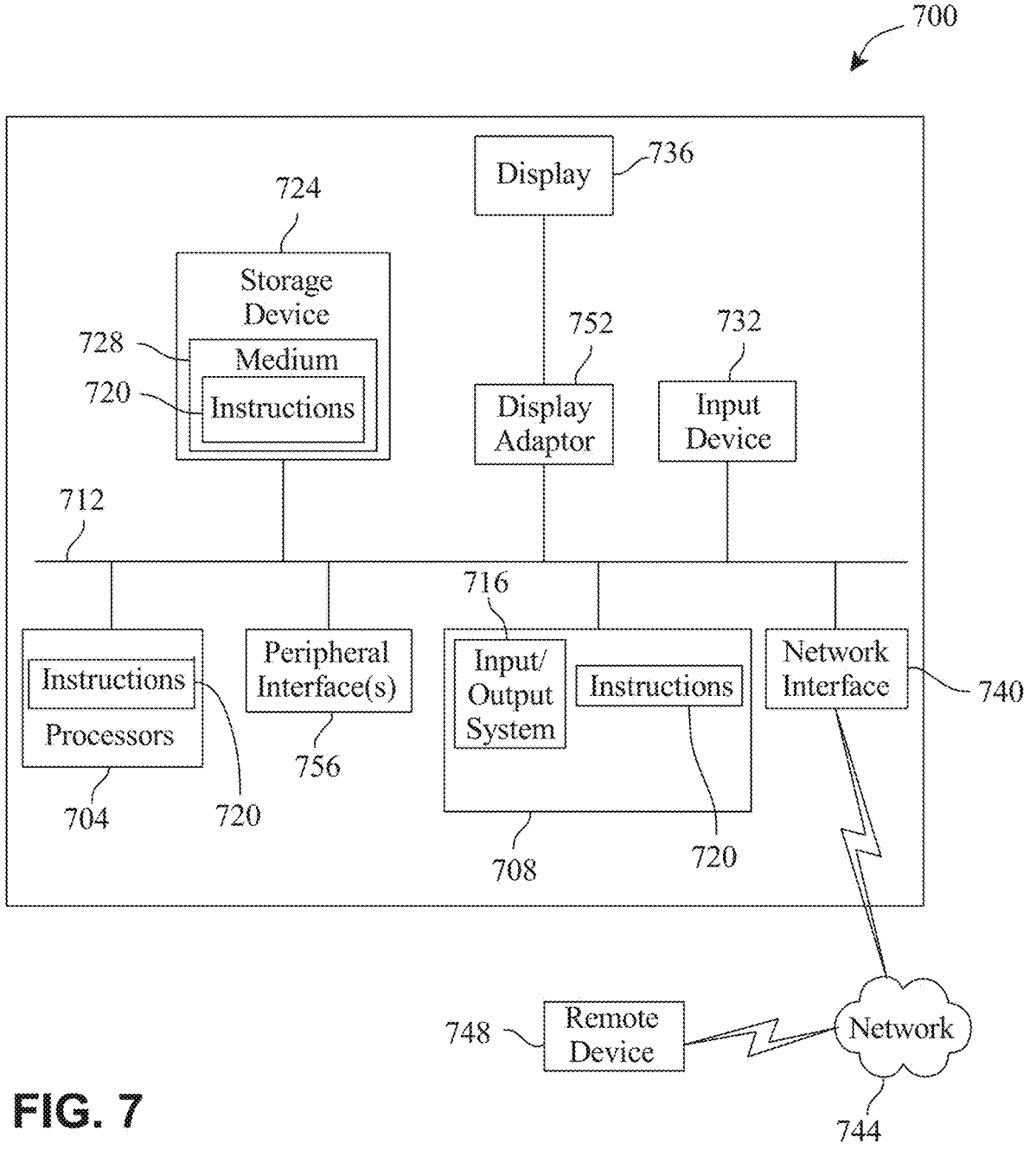
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automatically updating a visual element on a graphical user interface, wherein the apparatus comprises:
   at least a computing device, wherein the computing device comprises:
   a memory; and
   at least a processor communicatively connected to the memory, wherein the memory contains instructions configuring the at least a processor to:
   generate a graphical user interface comprising a plurality of visual elements, wherein the plurality of visual elements comprises a plurality of interactive components, wherein each of the plurality of interactive components comprises an interaction event handler;

display, using the graphical user interface, at least a command corresponding to an interactive component;
   detect, using an interaction event handler of a plurality of interaction event handlers, an input corresponding to a reference datum comprising baseline data for comparison, analysis, and/or validation within a system and further comprising safety standards of the at least a command;
   determine, using a tracking module, interaction data corresponding to the input; and
   generate a modified graphical user interface by dynamically updating the plurality of visual elements in the graphical user interface in response to the input, predefined data, and the interaction data;
   wherein an interface simulator is configured to generate the modified graphical user interface and further dynamically update the plurality of visual elements in the graphical user interface in response to at least one change associated with a system state; and
   wherein non-compliant data associated with at least one of: the input, predefined data, the interaction data and the system state is operable to trigger a recommendation based on the reference datum;
   wherein the apparatus further comprises a large language model configured to:
   receive the input;
   process the input according to at least one of: a safety context and a compliance context, wherein processing the input comprises identifying actionable insights comprising the recommendation, wherein an actionable insight comprises data derived from at least one of analysis, processing and evaluation that can directly inform and guide at least one of a decision, an intervention and a follow-up action associated with the system; and
   generate an output based on the actionable insights, wherein the apparatus is further configured to generate the modified graphical user interface using the output, wherein the modified graphical user interface comprises at least one of: reordering and aggregating of the plurality of visual elements.

2. The apparatus of claim 1, wherein dynamically updating the plurality of visual elements comprises modifying a format datum associated with the command.

3. The apparatus of claim 1, wherein dynamically updating the plurality of visual elements further comprises rearranging the plurality of visual elements corresponding to the command.

4. The apparatus of claim 1, wherein the interface simulator is trained using simulator training data comprising historical interaction data and historical predefined data corresponding to historical graphical user interface configurations.

5. The apparatus of claim 4, wherein the interface simulator is further trained using a score assigned to the modified graphical user interface.

6. The apparatus of claim 5, wherein the modified graphical user interface is assigned the score as a function of a user navigation metric.

7. The apparatus of claim 1, wherein the interaction data comprises a selection datum corresponding to the plurality of visual elements of the at least a command.

8. The apparatus of claim 1, wherein generating the modified graphical user interface further comprises classifying, using a classifier, the command as a function of a classification datum, wherein the classification datum is used to dynamically adjust displayed content based on the command.

9. The apparatus of claim 8, wherein the classifier is trained using classifier training data comprising historical classification data corresponding to historical commands.

10. A method for automatically updating a visual element on a graphical user interface, wherein the method comprises:

generating, using at least a processor, a graphical user interface comprising a plurality of visual elements, wherein the plurality of visual elements comprises a plurality of interactive components, wherein each of the plurality of interactive components comprises an interaction event handler;

displaying, using the graphical user interface, at least a command corresponding to an interactive component;

detecting, using an interaction event handler of a plurality of interaction event handlers, an input corresponding to a reference datum comprising baseline data for comparison, analysis, and/or validation within a system and further comprising safety standards of the at least a command;

determining, using a tracking module, interaction data corresponding to the input; and generating, using the at least a processor, a modified graphical user interface by dynamically updating the plurality of visual elements in the graphical user interface in response to the input, predefined data, and the interaction data;

generating, using an interface simulator, the modified graphical user interface and further dynamically update the plurality of visual elements in the graphical user interface in response to at least one change associated with a system state; and triggering, in response to non-compliant data associated with at least one of: the input, predefined data, the interaction data and the system state, a recommendation based on the reference datum;

receiving, by a large language model, the input:

processing, by the large language model, the input according to at least one of: a safety context and a compliance context, wherein processing the input comprises identifying actionable insights comprising the recommendation, wherein an actionable insight comprises data derived from at least one of: analysis, processing and evaluation that can directly inform and guide at least one of a decision, an intervention and a follow-up action associated with the system; and generating, by the large language model, an output based on the actionable insights; and generating the modified graphical user interface using the output, wherein the modified graphical user interface comprises at least one of: reordering and aggregating of the plurality of visual elements.

11. The method of claim 10, wherein dynamically updating the plurality of visual elements comprises modifying a format datum associated with the command.

12. The method of claim 10, wherein dynamically updating the plurality of visual elements further comprises rearranging the plurality of visual elements corresponding to the command.

13. The method of claim 10, wherein the interface simulator is trained using simulator training data comprising historical interaction data and historical predefined data corresponding to historical graphical user interface configurations.

14. The method of claim 1, wherein the interface simulator is further trained using a score assigned to the modified graphical user interface.

15. The method of claim 14, wherein the modified graphical user interface is assigned the score as a function of a user navigation metric.

16. The method of claim 10, wherein the interaction data comprises a selection datum corresponding to the plurality of visual elements of the at least a command.

17. The method of claim 10, wherein generating the modified graphical user interface further comprises classifying, using a classifier, the command as a function of a classification datum wherein the classification datum is used to dynamically adjust displayed content based on the command.

18. The method of claim 17, wherein the classifier is trained using classifier training data comprising historical classification data corresponding to historical commands.

* * * * *